United States Patent
Wu et al.

(10) Patent No.: US 12,250,586 B2
(45) Date of Patent: Mar. 11, 2025

(54) APPARATUS AND METHOD FOR COMMUNICATION WITH BUFFER STATUS REPORT

(71) Applicant: LENOVO (BEIJING) LIMITED, Beijing (CN)

(72) Inventors: Lianhai Wu, Beijing (CN); Joachim Loehr, Wiesbaden (DE); Prateek Basu Mallick, Dreieich (DE); Haiming Wang, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 508 days.

(21) Appl. No.: 17/421,350

(22) PCT Filed: Jan. 14, 2019

(86) PCT No.: PCT/CN2019/071608
§ 371 (c)(1),
(2) Date: Jul. 7, 2021

(87) PCT Pub. No.: WO2020/146976
PCT Pub. Date: Jul. 23, 2020

(65) Prior Publication Data
US 2021/0400526 A1    Dec. 23, 2021

(51) Int. Cl.
*H04W 28/02*    (2009.01)
*H04W 40/22*    (2009.01)
*H04W 72/20*    (2023.01)

(52) U.S. Cl.
CPC ....... *H04W 28/0278* (2013.01); *H04W 40/22* (2013.01); *H04W 72/20* (2023.01)

(58) Field of Classification Search
CPC ............. H04W 28/0278; H04W 72/20; H04W 72/569; H04W 40/22; H04W 72/21
See application file for complete search history.

(56) References Cited

U.S. PATENT DOCUMENTS

| 6,035,335 A | 3/2000 | Franke et al. |
| 11,350,305 B2 * | 5/2022 | Kim ...................... H04W 72/27 |

(Continued)

FOREIGN PATENT DOCUMENTS

| CN | 108289331 A | 7/2018 |
| WO | 2011123549 A1 | 10/2011 |
| WO | 2014162003 A1 | 10/2014 |

OTHER PUBLICATIONS

Internation Searching Authority, "Written Opinion of the International Searching Authority," PCT/CN2019/071608, Sep. 23, 2019, pp. 1-3.

(Continued)

*Primary Examiner* — Raj Jain
(74) *Attorney, Agent, or Firm* — Kunzler Bean & Adamson

(57) ABSTRACT

Method and apparatus for communication in an Integrated Access and Backhaul (IAB) system with buffer status report (BSR) are disclosed. The apparatus include a receiver that receives a BSR indicating that data is expected to be received; a processor that calculates a first type of buffer size based on the received BSR indicating that data is expected to be received and/or a second type of buffer size based on data presently stored in a buffer; and a transmitter that transmits a buffer status comprising the first type of buffer size and/or the second type of buffer size.

19 Claims, 8 Drawing Sheets

(56) References Cited

U.S. PATENT DOCUMENTS

| | | | |
|---|---|---|---|
| 11,496,923 B2* | 11/2022 | Zhu .................. | H04W 72/1263 |
| 2010/0070814 A1* | 3/2010 | Damnjanovic ....... | H04W 24/10 |
| | | | 714/809 |
| 2010/0322144 A1 | 12/2010 | Lee et al. | |
| 2011/0269393 A1 | 11/2011 | Oestergaard et al. | |
| 2017/0273072 A1 | 9/2017 | Wittberg et al. | |
| 2018/0234359 A1* | 8/2018 | Hosseini ............... | H04L 1/1861 |
| 2018/0270698 A1* | 9/2018 | Babaei .................. | H04W 72/21 |
| 2020/0077295 A1* | 3/2020 | Shi ..................... | H04W 28/0252 |
| 2020/0344640 A1* | 10/2020 | Wu ....................... | H04W 72/21 |
| 2021/0321426 A1* | 10/2021 | Lee ....................... | H04W 72/21 |
| 2021/0345163 A1* | 11/2021 | Narasimha ......... | H04W 28/0278 |
| 2021/0400526 A1* | 12/2021 | Wu ....................... | H04W 72/21 |

OTHER PUBLICATIONS

LG Electronics Inc., Scheduling enhancement in IAB, 3GPP TSG-RAN WG2 Meeting #103, R2-1812638, Aug. 20-24, 2018, pp. 1-2, Gothenburg, Sweden.

Intel Corporation, Uplink Latency in IAB networks, 3GPP TSG RAN WG2 Meeting #104, R2-1817700, Nov. 12-16, 2018, pp. 1-4, Spokane, USA.

\* cited by examiner

| Total Early Buffer Size(8bit) | 606

Figure 6A

| LCG7 | LCG6 | LCG5 | LCG4 | LCG3 | LCG2 | LCG1 | LCG0 |  618
| Early Buffer Size 1 |  616
| Early Buffer Size 2 |

...

| Early Buffer Size m |

Figure 6B

APPARATUS AND METHOD FOR COMMUNICATION WITH BUFFER STATUS REPORT

FIELD

The subject matter disclosed herein relates generally to wireless communication, and more particularly relates to apparatus and method for communication in an Integrated Access and Backhaul (IAB) system with buffer status report (BSR).

BACKGROUND

The following abbreviations and acronyms are herewith defined, at least some of which are referred to within the following description.

Third Generation Partnership Project ("3GPP"), New Radio ("NR"), Evolved Node B ("eNB"), 5G Node B ("gNB"), Downlink ("DL"), Uplink ("UL"), Long Term Evolution ("LTE"), LTE Advanced ("LTE-A"), Evolved UMTS Terrestrial Radio Access Network ("E-UTRAN"), Acknowledgement ("ACK"), Negative Acknowledgement ("NACK"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Machine Type Communication ("MTC"), enhanced MTC ("eMTC"), Narrow Band Internet of Things ("NBIoT"), Internet of Things ("IoT"), Physical Downlink Control Channel ("PDCCH"), MTC Physical Downlink Control Channel ("MPDCCH"), Narrowband Physical Downlink Control Channel ("NPDCCH"), Physical Downlink Shared Channel ("PDSCH"), Time Division Duplex ("TDD"), Frequency-Division Multiplexing ("FDM"), Time-Division Multiplexing ("TDM"), Code-Division Multiplexing ("CDM"), User Entity/Equipment (remote device) ("UE"), Network Equipment ("NE"), Discontinuous Reception ("DRX"), Low Power Wide Area ("LPWA"), Paging Occasion ("PO"), System Information Block ("SIB"), Bandwidth Reduced Low Complexity/Coverage Enhancement ("BL/CE"), Identification ("ID"), Non-Access Stratum ("NAS"), Preconfigured Uplink Resource ("PUR"), Common Search Space ("CSS"), UE-specific Search Space ("USS"), Single-Carrier Frequency-Division Multiple Access ("SC-FDMA"), Transport Block Size ("TBS"), Modulation Coding Scheme ("MCS"), Downlink Control Indicator ("DCI"), Random Access Channel ("RACH"), Physical Random Access Channel ("PRACH"), Medium Access Control ("MAC"), Downlink Shared Channel ("DL-SCH"), Uplink Shared Channel ("UL-SCH"), Random Access Response ("RAR"), Radio Network Temporary Identifier ("RNTI"), Random Access Radio Network Temporary Identifier ("RA-RNTI"), Single Frequency Network ("SFN"), Buffer Status Report ("BSR"), Integrated Access and Backhaul ("IAB"), millimeter Wave ("mmWave"), Mobile Termination ("MT") and Distributed Unit ("DU"), Central Unit ("CU"), gNB Central Unit ("gNB-CU"), gNB Distributed Units ("gNB-DUs"), gNB Central Unit Control Plane ("gNB-CU-CP"), gNB Central Unit User Plane ("gNB-CU-UP"), Radio Resource Control ("RRC"), Service Data Adaptation Protocol ("SDAP") and Packet Data Convergence Protocol ("PDCP"), Radio Link Control ("RLC"), Physical Layer ("PHY"), Next Generation Radio Access Network ("NG-RAN"), Scheduling Request ("SR"), End-to-End ("E2E"), MAC Control Element ("MAC CE"), Logical Channel ("LCH"), Logical Channel ID ("LCID"), Protocol Data Unit ("PDU"), Logical Channel Group ("LCG"), Physical Uplink Shared Channel ("PUSCH").

In wireless communication, such as a Third Generation Partnership Project ("3GPP") mobile network, a wireless mobile network may provide a seamless wireless communication service to a wireless communication terminal having mobility. The wireless mobile network may be formed of a plurality of base stations. Each base station may operate one cell. A base station may perform wireless communication with a wireless communication terminal placed within a corresponding cell.

Radio technologies in cellular communications have evolved rapidly. The amount of traffic in cellular networks has experienced tremendous growth and expansion. Consequently, advancements in future networks are driven by the need to provide and account for massive connectivity and volume, expanded throughput and capacity, and ultra-low latency. Fifth generation (5G) access networks, which can also be referred to as New Radio (NR) access networks, are currently being developed and are expected to handle a very wide range of use cases and requirements.

With the increasing network densification, it has become exceedingly difficult to provide traditional fiber backhaul access to each cell site, which is especially true for small cell base stations. The increasing maturity of millimeter wave (mmWave) communication has opened up the possibility of providing high-speed wireless backhaul to such cell sites. Since mmWave is also suitable for access links, the third generation partnership project (3GPP) is envisioning an Integrated Access and Backhaul (IAB) architecture for the fifth generation (5G) cellular networks in which the same infrastructure and spectral resources will be used for both access and backhaul.

SUMMARY

Apparatus and method for communication with buffer status report are disclosed.

According to a first aspect, there is provided an apparatus comprising: a receiver that receives a buffer status report (BSR) indicating that data is expected to be received; a processor that calculates a first type of buffer size based on the received BSR indicating that data is expected to be received and/or a second type of buffer size based on data presently stored in a buffer; and a transmitter that transmits a buffer status comprising the first type of buffer size and/or the second type of buffer size.

Optionally, the receiver receives a plurality of BSRs from a plurality of remote devices.

Optionally, the received BSR comprises a plurality of logical channel groups for receiving data and a buffer size for each of the logical channel groups; the first type of buffer size comprises an early buffer size indicating an amount of data that is expected to be received in the said plurality of logical channel groups; and the buffer status to be reported is a combined buffer status, and further comprises a first buffer status comprising information of the first type of buffer size; and a second buffer status comprising the second type of buffer size which is described as short BSR format or long BSR format or long truncated BSR format.

Optionally, the second buffer status comprising the second type of buffer size which is described as short BSR format; and the combined buffer status to be reported comprises the second buffer status and the first buffer status added to the end of the second buffer status.

Optionally, the second buffer status comprises the buffer sizes which are described as long BSR format or long truncated BSR format; and the combined buffer status to be reported comprises the second buffer status and the first buffer status added to the end of said long BSR format or long truncated BSR format.

Optionally, the first type of buffer size comprises a total early buffer size indicating an amount of data that is expected to be received from the said plurality of remote devices until a Media Access Control Protocol Data Unit (MAC PDU) assembly.

Optionally, the receiver receives a plurality of the BSRs from a single remote device; and the first type of buffer size is calculated based on last received BSR.

Optionally, the buffer status to be reported is allocated with a Logical Channel ID (LCID) which is different from LCIDs of the Short BSR, Long BSR, or Truncated BSR.

Optionally, the received BSR comprises a plurality of logical channel groups for receiving data and a buffer size for each of the logical channel groups; and the first type of buffer size is organized according to priority information.

Optionally, information of the logical channel groups is the priority information.

Optionally, the received BSR comprises a first received BSR from a first remote device and a second received BSR from a second remote device; the first received BSR comprises a plurality of instances of buffer size with a priority; the second received BSR comprises a plurality of instances of buffer size with the same priority; and the buffer size value with the same priority from the first received BSR and the second received BSR are accumulated to form a buffer size of the said priority.

Optionally, the received BSR comprises a first received BSR from a first remote device and a second received BSR from a second remote device; the buffer size with a priority is corresponding to the first type of buffer size; the buffer size with a same priority is corresponding to the second type of buffer size; the buffer size values with a same priority from the first type of buffer size and second type of buffer size are accumulated to form a buffer size of the said priority.

Optionally, the first type of buffer size is included in the buffer status report with higher priority comparing to the second type of buffer size when available uplink resource for transmitting buffer status is limited.

Optionally, the second type of buffer size is included in the buffer status report with higher priority comparing to the first type of buffer size when available uplink resource for transmitting buffer status is limited.

Optionally, information of buffer size with higher priority from the first type of buffer size and the second type of buffer size is included in the buffer status report when available uplink resource for transmitting buffer status is limited.

Optionally, the received BSR comprises a plurality of logical channel groups for receiving data and a buffer size for each of the logical channel groups; the first type of buffer size comprises an early buffer size indicating an amount of data that is expected to be received in the said plurality of logical channel groups.

Optionally, the received BSR comprises a plurality of logical channel groups for receiving data and a buffer size for each of the logical channel groups; the first type of buffer size is organized according to priority information.

Optionally, information of logical channel groups is used to identify priority information.

Optionally, the buffer status to be reported further comprises information of a logical channel group for transmitting data.

According to a second aspect, there is provided an apparatus comprising: a receiver that receives a plurality of BSRs from a plurality of remote devices; and a transmitter that transmits a buffer status indicating that data is expected to be received; wherein the transmitter, upon determination that there is no uplink resource available, transmits a scheduling request (SR).

Optionally, the BSRs comprise a plurality of logical channel groups; a priority value is obtainable from identifications of the logical channel groups; and transmission of the SR is selected based on a highest priority value of logical channels included in the said plurality of logical channel groups.

According to a third aspect, there is provided a method comprising: receiving, by a receiver, a buffer status report (BSR) indicating that data is expected to be received; calculating, by a processor, a first type of buffer size based on the received BSR indicating that data is expected to be received and/or a second type of buffer size based on data presently stored in a buffer; and transmitting, by a transmitter, a buffer status comprising the first type of buffer size and/or the second type of buffer size.

Optionally, the receiver receives a plurality of BSRs from a plurality of remote devices.

Optionally, the received BSR comprises a plurality of logical channel groups for receiving data and a buffer size for each of the logical channel groups; the first type of buffer size comprises an early buffer size indicating an amount of data that is expected to be received in the said plurality of logical channel groups; and the buffer status to be reported is a combined buffer status, and further comprises a first buffer status comprising information of the first type of buffer size; and a second buffer status comprising the second type of buffer size which is described as short BSR format or long BSR format or long truncated BSR format.

Optionally, the second buffer status comprising the second type of buffer size which is described as short BSR format; and the combined buffer status to be reported comprises the second buffer status and the first buffer status added to the end of the second buffer status.

Optionally, the second buffer status comprises the buffer sizes which are described as long BSR format or long truncated BSR format; and the combined buffer status to be reported comprises the second buffer status and the first buffer status added to the end of said long BSR format or long truncated BSR format.

Optionally, the first type of buffer size comprises a total early buffer size indicating an amount of data that is expected to be received from the said plurality of remote devices until a Media Access Control Protocol Data Unit (MAC PDU) assembly.

Optionally, the receiver receives a plurality of the BSRs from a single remote device; and the first type of buffer size is calculated based on last received BSR.

Optionally, the buffer status to be reported is allocated with a Logical Channel ID (LCID) which is different from LCIDs of the Short BSR, Long BSR, or Truncated BSR.

Optionally, the received BSR comprises a plurality of logical channel groups for receiving data and a buffer size for each of the logical channel groups; and the first type of buffer size is organized according to priority information.

Optionally, information of the logical channel groups is the priority information.

Optionally, the received BSR comprises a first received BSR from a first remote device and a second received BSR from a second remote device; the first received BSR comprises a plurality of instances of buffer size with a priority;

the second received BSR comprises a plurality of instances of buffer size with the same priority; and the buffer size value with the same priority from the first received BSR and the second received BSR are accumulated to form a buffer size of the said priority.

Optionally, the received BSR comprises a first received BSR from a first remote device and a second received BSR from a second remote device; the buffer size with a priority is corresponding to the first type of buffer size; the buffer size with a same priority is corresponding to the second type of buffer size; the buffer size values with a same priority from the first type of buffer size and second type of buffer size are accumulated to form a buffer size of the said priority.

Optionally, the first type of buffer size is included in the buffer status report with higher priority comparing to the second type of buffer size when available uplink resource for transmitting buffer status is limited.

Optionally, the second type of buffer size is included in the buffer status report with higher priority comparing to the first type of buffer size when available uplink resource for transmitting buffer status is limited.

Optionally, information of buffer size with higher priority from the first type of buffer size and the second type of buffer size is included in the buffer status report when available uplink resource for transmitting buffer status is limited.

Optionally, the received BSR comprises a plurality of logical channel groups for receiving data and a buffer size for each of the logical channel groups; the first type of buffer size comprises an early buffer size indicating an amount of data that is expected to be received in the said plurality of logical channel groups.

Optionally, the received BSR comprises a plurality of logical channel groups for receiving data and a buffer size for each of the logical channel groups; the first type of buffer size is organized according to priority information.

Optionally, information of logical channel groups is used to identify priority information.

Optionally, the buffer status to be reported further comprises information of a logical channel group for transmitting data.

According to a fourth aspect, there is provided a method comprising: receiving, by a receiver, a plurality of BSRs from a plurality of remote devices; transmitting, by a transmitter, a buffer status indicating that data is expected to be received; transmitting, by the transmitter, a scheduling request (SR) upon determination that there is no uplink resource available.

Optionally, the BSRs comprise a plurality of logical channel groups; a priority value is obtainable from identifications of the logical channel groups; and transmission of the SR is selected based on a highest priority value of logical channels included in the said plurality of logical channel groups.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 6A is a schematic diagram illustrating a short early BSR;

FIG. 6B is a schematic diagram illustrating a long (truncated) early BSR;

DETAILED DESCRIPTION

Figure 1A:
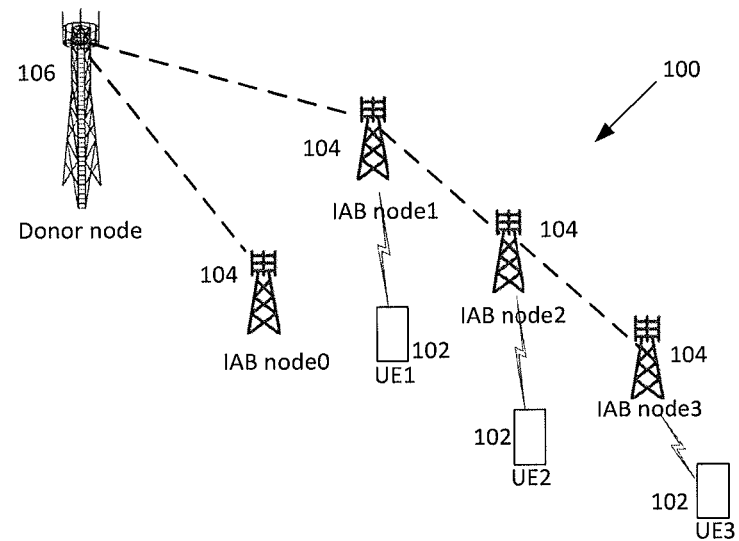
FIG. 1A is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately form devices, or two parts or components of the same device. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1A is a schematic diagram illustrating a wireless communication system. It depicts an embodiment of a wireless communication system 100 for an IAB network. In one embodiment, the wireless communication system 100 may include user equipment (UEs) 102 and network equipment (NEs) 104/106. Even though a specific number of UEs 102 and NEs 104/106 is depicted in FIG. 1, one skilled in the art will recognize that any number of UEs 102 and NEs 104/106 may be included in the wireless communication system 100.

In one embodiment, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. Moreover, the UEs 102 may be referred to as remote units, subscriber units, mobiles, mobile stations, users, terminals, mobile terminals, fixed terminals, subscriber stations, user terminals, a device, or by other terminology used in the art. The UEs 102 may communicate directly with one or more of the NEs 104/106 via UL communication signals.

The network equipment may be distributed over a geographic region. In this exemplary IAB network, the network equipment 104/106 includes a plurality of IAB nodes 104 and a donor node, or IAB donor, 106. In certain embodiments, network equipment 104/106 may also be referred to as an access point, an access terminal, a base, a base station, a Node-B, an eNB, a gNB, a Home Node-B, a relay node, a device, or by any other terminology used in the art. Throughout this specification, a reference to base station may refer to any one of the above referenced type of the network equipment 104/106, such as eNG and gNB. The network equipment 104/106 is generally part of a radio access network that includes one or more controllers communicably coupled to one or more corresponding network equipment 104/106. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). In some implementations, the wireless communication system 100 is compliant with the 3GPP protocol, wherein the NEs 104/106 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX, among other protocols. The present disclosure is not intended to be limited to the implementation of any particular wireless communication system architecture or protocol.

The network equipment 104/106 may serve a number of UEs 102 within a serving area, for example, a cell (or a cell sector) or more cells via a wireless communication link. The network equipment 104/106 transmits DL communication signals to serve the UEs 102 in the time, frequency, and/or spatial domain.

The IAB network shown in FIG. 1, utilizes multi-hop backhauling to provide more range extension than single hop. For example, UE3 may be connected to donor node relayed by IAB node1, IAB node2 and IAB node3. This is especially beneficial for above-6 GHz frequencies due to their limited range. Multi-hop backhauling further enables backhauling around obstacles, e.g. buildings in urban environment for in-clutter deployments. The IAB nodes 104 may be stationary or carried by a moving object.

Wireless backhaul links may be vulnerable to blockage, e.g., due to moving objects such as vehicles, due to seasonal changes such as foliage, or due to infrastructure changes such as new buildings. Such vulnerability also applies to physically stationary IAB-nodes. For example, IAB node2 may switch its connection to IAB node0 from IAB node1 if backhaul link with IAB node1 is blocked by moving objects.

Figure 1B:
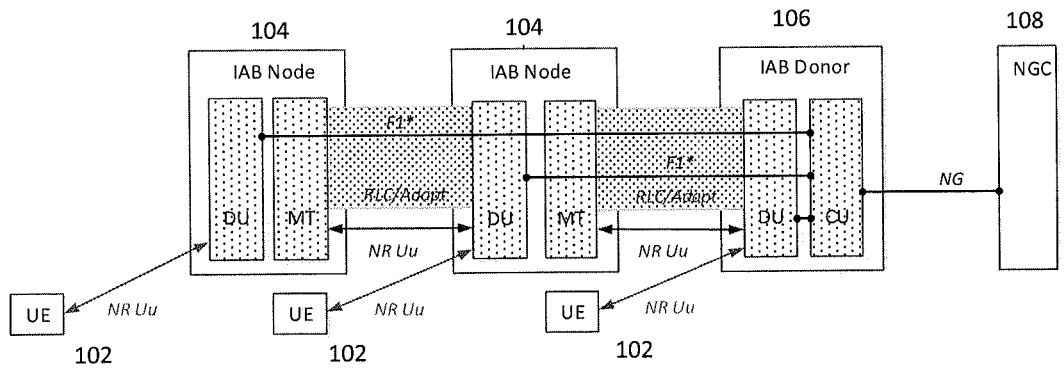
FIG. 1B is a schematic block diagram illustrating an architecture of implantation of the wireless communication system.

FIG. 1B is a schematic block diagram illustrating an architecture of implementation of the wireless communication system. It shows a reference diagram for IAB node in standalone mode, which contains one IAB-donor 106 and multiple IAB-nodes 104. The IAB-donor 106 may be treated as a single logical node that comprises a set of functions such as gNB Distributed Unit (gNB-DU), gNB Central Unit Control Plane (gNB-CU-CP), gNB Central Unit User Plane (gNB-CU-UP) and potentially other functions. In a deployment, the IAB-donor can be split according to these functions, which can all be either collocated or non-collocated as allowed by 3GPP Next Generation Radio Access Network (NG-RAN) architecture.

Each IAB node 104 may include a Mobile Termination (MT) and a Distributed Unit (DU). The MT function has been defined as a component of the Mobile Equipment, or user equipment (UE). In this example, MT may be referred to as a function residing on an IAB node 104 that terminates the radio interface layers of the backhaul Uu interface toward the IAB donor 106 or other IAB nodes 104. A Uu interface, also called air interface, is the interface between 5G UE and 5G-RAN.

The IAB donor 106, which may also be referred to as a gNB or a base station, may include a gNB Central Unit (gNB-CU) and one or more gNB Distributed Units (gNB-DUs). A gNB-CU and a gNB-DU is connected via F1 interface. The gNB-CU is a logical node hosting RRC, SDAP and PDCP protocols of the gNB. The gNB-DU is a logical node hosting RLC, MAC and PHY layers of the gNB. One cell may be supported by only one gNB-DU or IAB node DU. The IAB donor 106 may be communicably coupled to a core network, or Next Generation Core (NGC), which may in turn be coupled to other networks.

In an IAB network as shown in FIG. 1A, the IAB donor 106 is normally stationary, while both IAB nodes 104 and UEs 102 may be either stationary or movable. Thus, both UEs 102 and IAB nodes 104 may be referred to as remote devices.

An IAB node 104 in a chain of communication may be referred to as a parent IAB node or a child IAB node based on its relative position to another IAB node. For example, IAB node2 is a parent IAB node with respect to IAB node3, while this IAB node2 is also a child IAB node with respect to IAB node1 at the same time. Each IAB node may function as user equipment to its parent IAB node, and may also function as a base station to its child IAB node.

Figure 2:
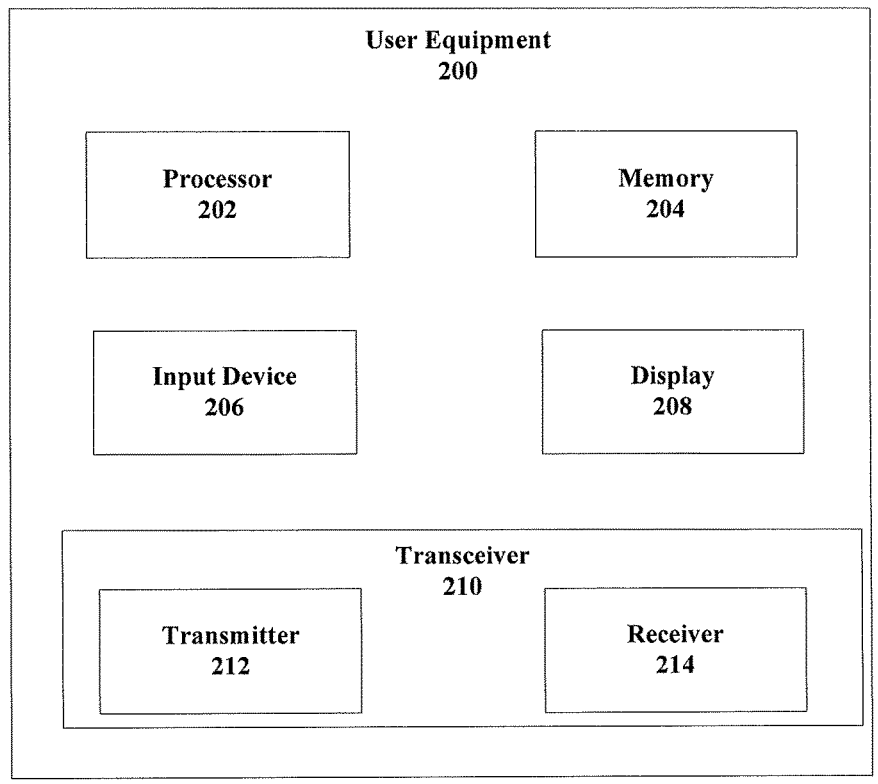
FIG. 2 is a schematic block diagram illustrating components of user equipment according to one embodiment.

FIG. 2 is a schematic block diagram illustrating components of UE according to one embodiment. The UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

The transceiver 210, in one embodiment, is configured to communicate wirelessly with network equipment. In certain embodiments, the transceiver 210 comprises a transmitter 212 and a receiver 214. The transmitter 212 is used to transmit UL communication signals to network equipment and the receiver 214 is used to receive DL communication signals from network equipment. For example, the transmitter 212 may transmit a HARQ-ACK including feedbacks for one or more DL transmissions. As another example, the receiver 214 may receive various configurations/data from network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, UE 200 includes a plurality of transmitter 212 and receiver 214 pairs for communicating on a plurality of wireless networks and/or radio frequency bands, each transmitter 212 and receiver 214 pair configured to communicate on a different wireless network and/or radio frequency band from the other transmitter 212 and receiver 214 pairs.

Figure 3:
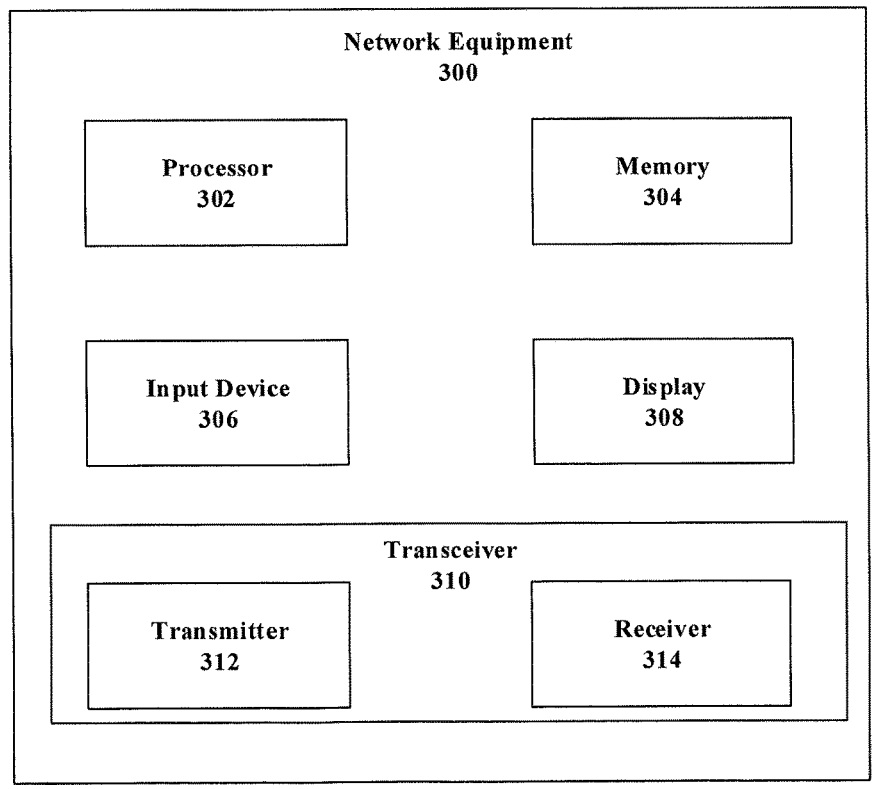
FIG. 3 is a schematic block diagram illustrating components of network equipment according to one embodiment.

FIG. 3 is a schematic block diagram illustrating components of network equipment according to one embodiment. The network equipment (NE) 300 may be an implementation of IAB node 104 or IAB donor 106. Logically, as shown in FIG. 1B, an IAB node 104 may include a Mobile Termination (MT) and a Distributed Unit (DU); and an IAB donor 106, may include a gNB Central Unit (gNB-CU) and one or more gNB Distributed Units (gNB-DUs).

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to UE 200. The processor 302 may also control the transceiver 310 to receive UL signals/data from UE 200. For example, the processor 302 may control the transceiver 310 to receive a HARQ-ACK including feedbacks for one or more DL transmissions. In another example, the processor 302 may control the transceiver 310 to transmit DL signals for various configurations to UE 200, as described above.

The transceiver 310, in one embodiment, is configured to communicate wirelessly with UE 200. In certain embodiments, the transceiver 310 comprises a transmitter 312 and a receiver 314. The transmitter 312 is used to transmit DL communication signals to UE 200 and the receiver 314 is used to receive UL communication signals from UE 200. For example, the receiver 314 may receive a HARQ-ACK codebook from UE 200. As another example, the transmitter 312 may transmit the various configurations/data of NE 300.

The transceiver 310 may communicate simultaneously with a plurality of UEs 200. For example, the transmitter 312 may transmit DL communication signals to UE 200. As another example, the receiver 314 may simultaneously receive UL communication signals from UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, NE 300 may serve multiple cells and/or cell sectors, wherein the transceiver 310 includes a transmitter 312 and a receiver 314 for each cell or cell sector.

Figure 4A:
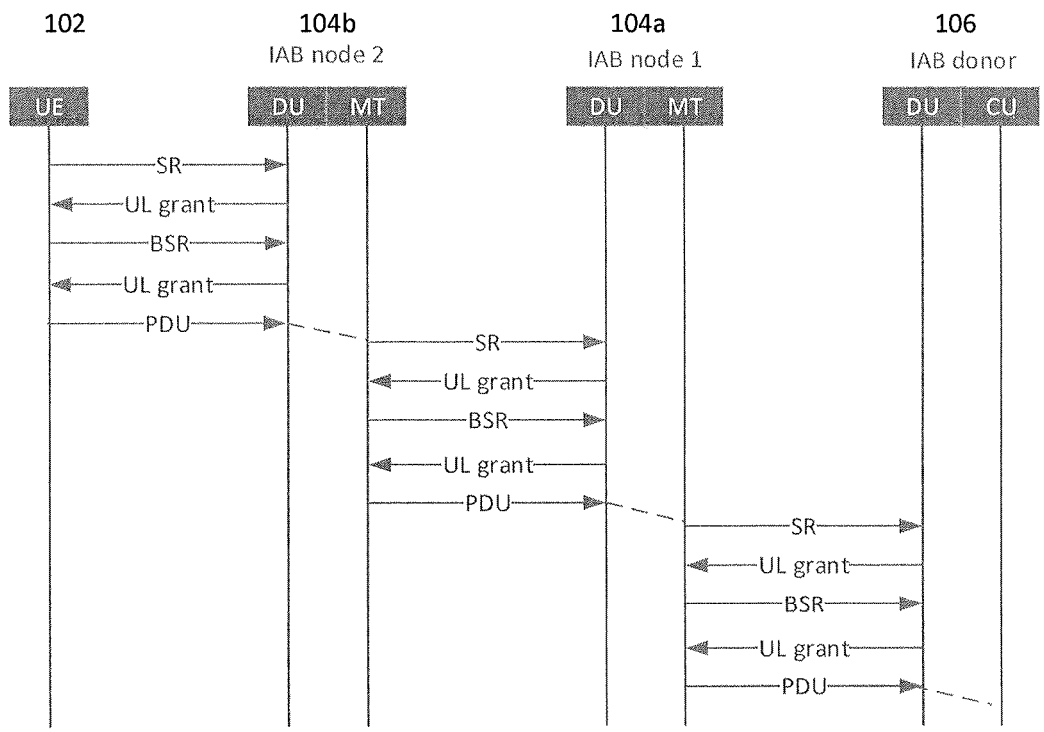
FIG. 4A is a schematic diagram illustrating uplink process in an IAB network.

FIG. 4A is a schematic diagram illustrating uplink process in an IAB network. This shows a worst case scenario, where none of the intermediate nodes 104a and 104b has any UL resources allocated to them. In this case, the UE 102 has to send a scheduling request (SR) to an IAB node 104b, or the IAB node2, at the beginning, and then wait for an UL grant. Upon receiving an UL grant from the IAB node2, the UE 102 is able to transmit a buffer status report (BSR) to the IAB node 104b, and then has to wait for another UL grant. The data stored in buffer, or protocol data unit (PDU), can be transmitted only after receiving the second UL grant. The IAB node 104*b* then receives the data and has to relay it further to IAB node 104*a* and IAB donor 106. Thus, this whole process between UE 102 and IAB node 104*b* has to be repeated between the IAB node 104*b* and IAB node 104*a*, and again between the IAB node 104*a* and the IAB donor 106, and therefore resulting in significant accumulated time delay.

Increased latency due to multiple hops in an IAB network can adversely impact the performance of both control plane procedures (such as handover and radio link recovery) and user plane data transmission. In order to achieve hop agnostic performance in IAB scheduling, it is important to reduce the end-to-end (E2E) delay from the UE 102 to the IAB donor 106, and meet the latency requirement, regardless of how many hops the UE 102 is away from the IAB donor 106.

In multi-hop networks, upstream data arriving from a child node may suffer scheduling delays at the parent node and intermediate nodes. To some extent, this is not different from a single-hop UE where new data arrives into UE buffers after a BSR is sent. However, in a multi-hop network, the delays are likely to accumulate due to the number of hops and the aggregated volume of data at IAB nodes and may require mitigation mechanisms.

It is clear that this process can be significantly longer than the corresponding process in one-hop networks, due to the multiple consecutive uplink resource request and allocation steps. The underlying reason for these delays is that the MT part of an IAB node 104 can only request uplink resources for the UL data transmission after it actually receives the data to be transmitted.

MAC Control Elements (MAC CEs) are used for MAC layer control signaling between the NE 300 and the UE 200. Several types of MAC CE are available, e.g. Buffer Status Report MAC CE, C-RNTI MAC CE, UE Contention Resolution Identity MAC CE, Timing Advance Command MAC CE, DRX Command MAC CE, etc.

Buffer Status Report (BSR) MAC CE includes information regarding how much data accumulated in the UE's buffer is delivered from the UE 200 to the NE 300. Four different Logical Channel ID (LCID) values may be used to differentiate among a Short BSR, a Long BSR, a Short Truncated BSR, and a Long Truncated BSR.

A BSR MAC CE may be any one of:
Short BSR format (fixed size),
Long BSR format (variable size),
Short Truncated BSR format (fixed size), or
Long Truncated BSR format (variable size).

The BSR formats are identified by MAC PDU subheaders with LCIDs. The number of the Buffer Size fields in the Long BSR format and Long Truncated BSR format can be zero. In one example, the fields in the BSR MAC CE are defined as follows:

LCG ID: The Logical Channel Group ID field identifies the group of logical channel(s) whose buffer status is being reported. The length of the field is 3 bits;

LCGi: For the Long BSR format, this field indicates the presence of the Buffer Size field for the logical channel group i. The LCGi field set to "1" indicates that the Buffer Size field for the logical channel group i is reported. The LCGi field set to "0" indicates that the Buffer Size field for the logical channel group i is not reported. For the Long Truncated BSR format, this field indicates whether logical channel group i has data available. The LCGi field set to "1" indicates that logical channel group i has data available. The LCGi field set to "0" indicates that logical channel group i does not have data available;

Buffer Size: The Buffer Size field identifies the total amount of data available according to the data volume calculation procedure in TSs 38.322 and 38.323 across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits. For the Long BSR format and the Long Truncated BSR format, the Buffer Size fields are included in ascending order based on the LCGi. For the Long Truncated BSR format the number of Buffer Size fields included is maximised, while not exceeding the number of padding bits.

Figure 4B:
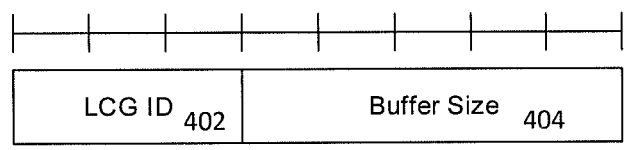
FIG. 4B is a schematic diagram illustrating a Short BSR and Short Truncated BSR MAC CE.
Figure 4C:
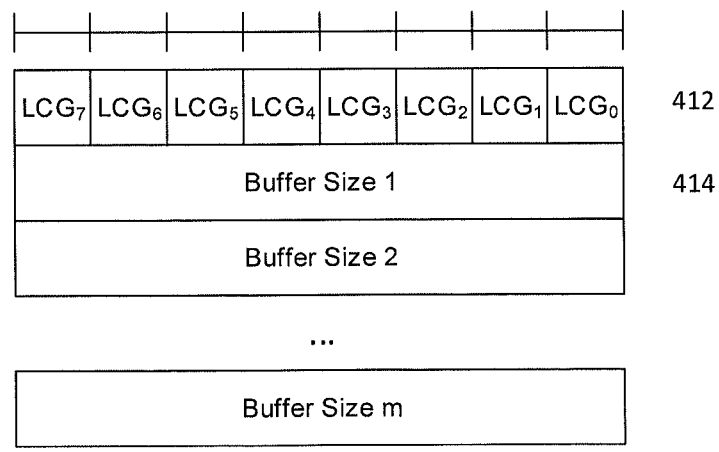
FIG. 4C is a schematic diagram illustrating a Long BSR and Long Truncated BSR MAC CE.

FIG. 4B is a schematic diagram illustrating a Short BSR and Short Truncated BSR MAC CE. In this example, one single byte, or 8 bits, is included in the Short BSR, and are divided into two fields: a LCG ID 402 of three bits and a Buffer Size 404 of five bits. FIG. 4C is a schematic diagram illustrating a Long BSR and Long Truncated BSR MAC CE. In this example, several bytes are included in the Long BSR. The first byte is Logical Channel Group (LCG) information 412 with 8 $LCG_i$ bits, followed by several bytes each containing a buffer size 414.

Figure 5A:
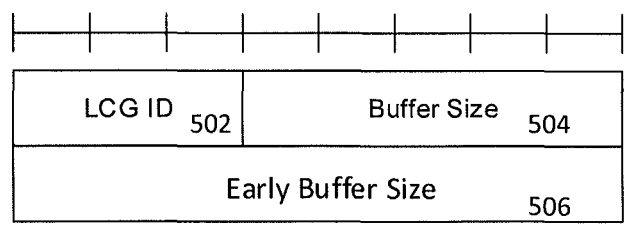
FIG. 5A is a schematic diagram illustrating a combined BSR with short BSR.
Figure 5B:
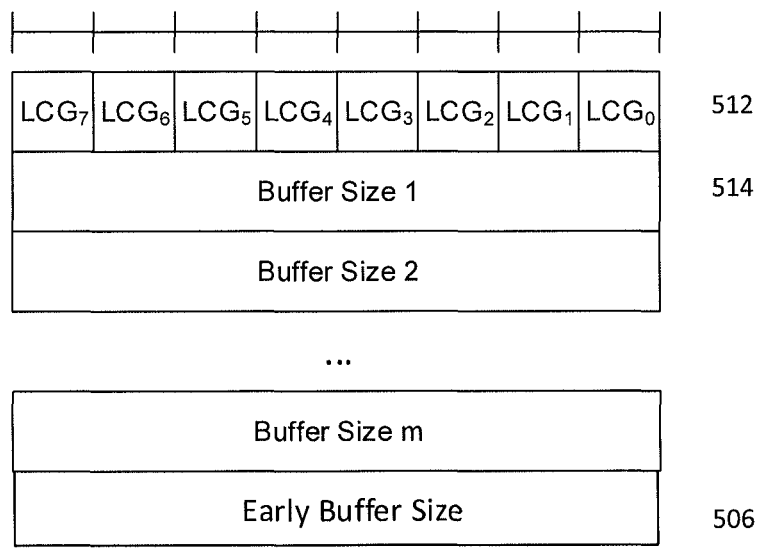
FIG. 5B is a schematic diagram illustrating a combined BSR with long BSR.

FIG. 5A is a schematic diagram illustrating a combined BSR with short BSR; and FIG. 5B is a schematic diagram illustrating a combined BSR with long BSR. In a first scenario, the content of early buffer status report (early BSR) and normal buffer status report (normal BSR) can merge into one buffer status report (BSR). The early BSR is a newly introduced BSR for reporting a buffer size based on an amount of data which is expected to be received. As shown in FIG. 1A, for example, when IAB node2 receives the BSR from the UE2, the buffer size of data which is expected to be received will be reported to parent IAB node, IAB node1, in order to reduce the latency. In addition, the normal buffer status, i.e. data which is in the IAB node2 already available for transmission, also needs to be reported to parent IAB node at the same UL grant. Therefore, it is possible that both early BSR and normal BSR can be merged into one combined BSR. In a second scenario, the early buffer status report and normal BSR may be separate.

In one example, with reference to the system structure of FIG. 1A, a process may be carried out according to the following steps:

Step 1: UE2 200, or IAB node3 104, accesses to gNB, or IAB donor 106, by multiple hop.

Step 2: UE2 200, or IAB node3 104, reports the BSR to parent IAB node2 when BSR is triggered.

Step 3: When IAB node2 receives the BSR from the UE2 200, or the child IAB node3, IAB node2 is able to know the amount of data which is expected to be received. In this step, the DU in IAB node2 will transmit the BSR information to MT in the IAB node.

Step 4: IAB node2 is triggered to transmit the buffer size of data which is expected to be received.

Step 5: IAB node2 transmits the buffer size of data which is expected to receive to parent IAB node1.

Step 6: IAB node1 will allocate UL grant to the IAB node2 based on the reported BSR.

In some embodiments, one "total early buffer size" is used to indicate the total amount of data across all the LCGs of the BSR reported by the child IAB node 104 or UE 102. Namely, all the buffer sizes per LCG which are expected to be received may be added up. The "total early buffer size" can be added to the end of short BSR and long (truncated) BSR shown in FIGS. 4B and 4C. To combine the short BSR, the second buffer size 506 can be added in the end of the short BSR to indicate the total early buffer size as shown in FIG. 5A. To combine with the long (truncated) BSR which includes m buffer size fields as shown in FIG. 5B, the new buffer size m+1 516 can be added in the end of long (truncated) BSR to indicate the total early buffer size. A new LCID may be allocated for the new combined BSR format, which is different from LCIDs of the Short BSR, Long BSR, or Truncated BSR.

Figure 5C:
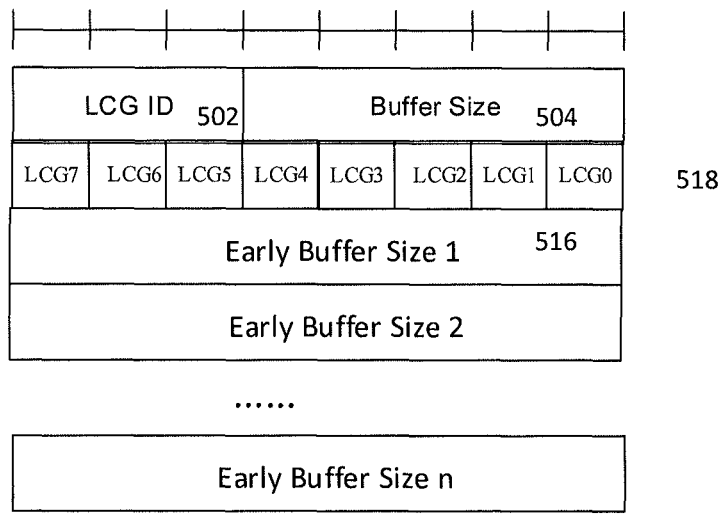
FIG. 5C is a schematic diagram illustrating a combined BSR with short BSR without LCG ID.
Figure 5D:
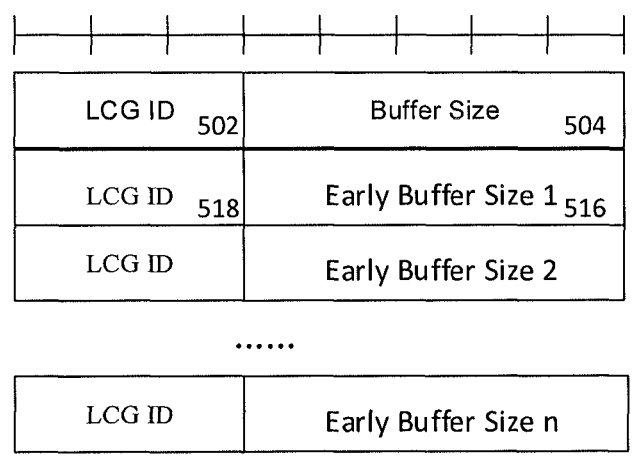
FIG. 5D is a schematic diagram illustrating a combined BSR with short BSR including LCG ID.

FIG. 5C is a schematic diagram illustrating a combined BSR with short BSR without LCG ID; and FIG. 5D is a schematic diagram illustrating a combined BSR with short BSR including LCG ID. The buffer sizes received from the child IAB node 104 or UE 102 will be re-mapped to multiple buffer sizes based on the priority information (e.g. LCG of the receiving node). For example, the buffer status for LCG #1, LCG #2 and LCG #3 from UE are received by IAB node2. Then, LCG #1, LCG #2 and LCG #3 will be re-mapped to LCG #2, LCG #3, and LCG #4 in IAB node2 transmitting side. The three early buffer sizes of LCG #2, LCG #3 and LCG #4 will be put in the end of BSR. The number of LCG may be related with priority information. Furthermore, the priority information per each early buffer size could be included in the combined BSR. This may provide a general scheme for a combined buffer status, and the case shown in FIGS. 5A and 5B may be a special case of this general scheme.

In some embodiments, the buffer size of data which is expected to be received may be added to the buffer size of normal data which is already available in the buffer. For example, the buffer status for LCG #1, LCG #2 and LCG #3 from UE are received by IAB node2. Then, LCG #1, LCG #2 and LCG #3 will be re-mapped to LCG #2, LCG #3, and LCG #4 in IAB node2 transmitting side. The early buffer size of LCG #2 will be added in the buffer size of LCG #2. Same calculation is applied to LCG #3 and LCG #4.

Figure 5E:
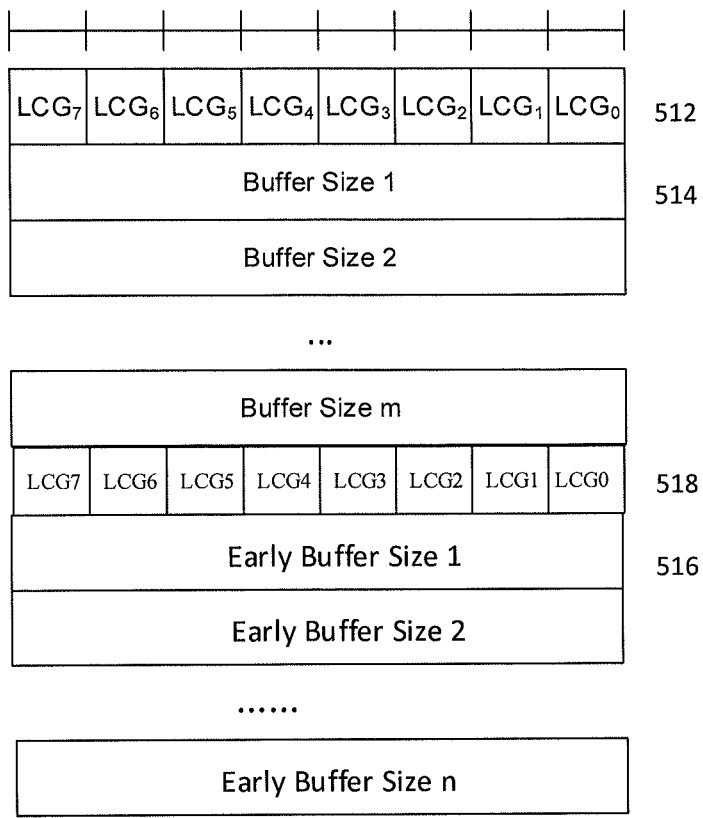
FIG. 5E is a schematic diagram illustrating a combined BSR with long BSR without LCG ID.
Figure 5F:
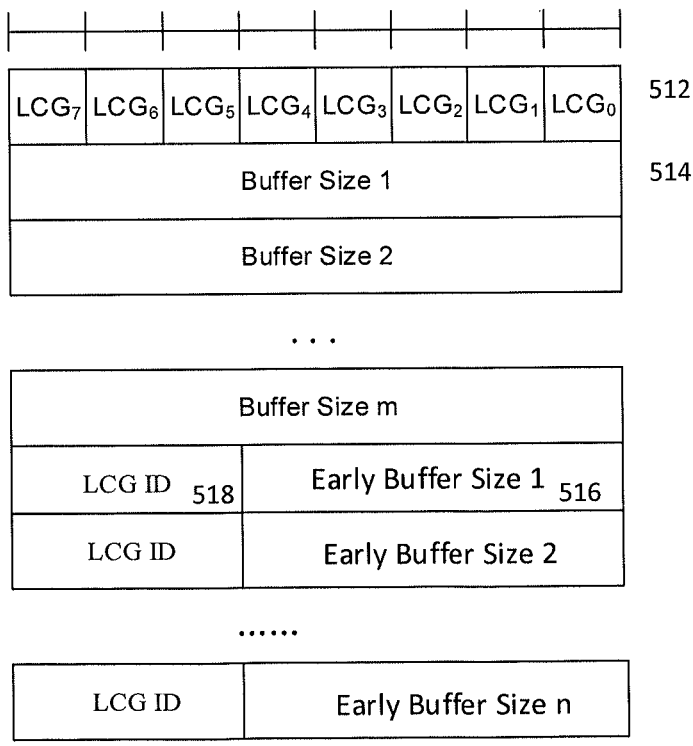
FIG. 5F is a schematic diagram illustrating a combined BSR with long BSR including LCG ID.

FIG. 5E is a schematic diagram illustrating a combined BSR with long BSR without LCG ID; and FIG. 5F is a schematic diagram illustrating a combined BSR with long BSR including LCG ID.

In one exemplary embodiment, the apparatus, in this case an IAB node 104, may comprise: a receiver 314 that receives a buffer status report (BSR) indicating that data is expected to be received; a processor 302 that calculates a first type of buffer size 506/516 based on the received BSR indicating that data is expected to be received and/or a second type of buffer size 504/514 based on data presently stored in a buffer; and a transmitter 312 that transmits a buffer status comprising the first type of buffer size 506/516 and/or the second type of buffer size 504/514.

The receiver 314 may receive a plurality of BSRs from a plurality of remote devices 102/104. The remote devices may include UEs and/or other child IAB nodes 104.

In some embodiments, the received BSR comprises a plurality of logical channel groups for receiving data and a buffer size for each of the logical channel groups; the first type of buffer size 506/516 comprises an early buffer size indicating an amount of data that is expected to be received in the said plurality of logical channel groups; and the buffer status to be reported is a combined buffer status, and further comprises a first buffer status comprising information of the first type of buffer size 506/516; and a second buffer status comprising the second type of buffer size 504/514 which is described as short BSR format or long BSR format or long truncated BSR format as shown in FIGS. 5A to 5F.

For example, shown in FIG. 5A, the second buffer status comprising the second type of buffer size 504 which is described as short BSR format; and the combined buffer status to be reported comprises the second buffer status and the first buffer status 506 added to the end of the second buffer status.

In another example, shown in FIG. 5B, the second buffer status comprises the buffer sizes 514 which are described as long BSR format or long truncated BSR format; and the combined buffer status to be reported comprises the second buffer status and the first buffer status 506 added to the end of said long BSR format or long truncated BSR format.

In some embodiments, the first type of buffer size 506/516 comprises a total early buffer size indicating an amount of data that is expected to be received from the said plurality of remote devices until a Media Access Control Protocol Data Unit (MAC PDU) assembly. In the case of receiving more than one BSR from the child IAB node (or UE) before next BSR is reported, the total early buffer size can be a sum of all received BSR(s) if BSRs are received from the different child IAB nodes and/or UE. All BSRs received from child IAB nodes 104 and/or UEs 102 until MAC PDU assembly (MAC PDU including the BSR MAC CE) are considered for total early buffer status. Those BSRs for which data is meanwhile already received at the IAB node, but not anymore expected to be received, is not reported in the early BSR, since this data is now already considered as the IAB node's own data. Alternatively or additionally, the early buffer size from different IAB node 104 and/or UE 102 corresponding to the same priority can be accumulated. All BSRs received from child IAB nodes and/or UEs until MAC PDU assembly (MAC PDU including the BSR MAC CE) are considered for total early buffer status.

In some embodiments, the receiver receives a plurality of the BSRs from a single remote device; and the first type of buffer size is calculated based on last received BSR. The single remote device from which the plurality of BSRs is received may be either UE 120, or a child IAB node 104. In the case that more than one BSRs are received from the same IAB node 104 or UE 102 before next BSR is reported, the early IAB BSR should only include buffer status according to the latest received BSR.

Optionally, the buffer status to be reported is allocated with a Logical Channel ID (LCID) which is different from LCIDs of the Short BSR, Long BSR, or Truncated BSR.

In some embodiments, as shown in FIGS. 5C to 5F, the received BSR comprises a plurality of logical channel groups 512 for receiving data and a buffer size for each of the logical channel groups 514; and the first type of buffer size 516 is organized according to priority information. Information of the logical channel groups 512 may be used as the priority information.

For example, the received BSR comprises a first received BSR from a first remote device and a second received BSR from a second remote device; the first received BSR comprises a plurality of instances of buffer size with a priority; the second received BSR comprises a plurality of instances of buffer size with the same priority; and the buffer size value with the same priority from the first received BSR and the second received BSR are accumulated to form a buffer size of the said priority. That is, the early buffer size from different IAB nodes 104 and/or UEs 102 corresponding to the same priority may be added together.

In another example, the received BSR comprises a first received BSR from a first remote device and a second received BSR from a second remote device; the buffer size with a priority is corresponding to the first type of buffer size; the buffer size with a same priority is corresponding to the second type of buffer size; the buffer size values with a same priority from the first type of buffer size and second type of buffer size are accumulated to form a buffer size of the said priority. Namely, the buffer size of data which is expected to be received is added to the buffer size of normal data which is already available in the buffer. For example, the buffer status for LCG #1, LCG #2 and LCG #3 from UE are received by IAB node2. Then, LCG #1, LCG #2 and LCG #3 will be re-mapped to LCG #2, LCG #3, and LCG #4 in IAB node2 transmitting side. The early buffer sizes of LCG #2 will be added in the buffer size of LCG #2. Same calculation is applied to LCG #3 and LCG #4.

For the truncated BSR format, if the number of buffer size fields included is maximized, while not exceeding the number of padding bits, in the combined BSR, selection of buffer size is required. Three exemplary options are provided as follows:

Option A: The early buffer size for early BSR should be kept in priority. The reason is that one-bit indication in legacy BSR format will indicate whether the corresponding LCG has available data for transmission. Thus, optionally, the first type of buffer size 506/516 is included in the buffer status report with higher priority comparing to the second type of buffer size 504/514 when available uplink resource for transmitting buffer status is limited.

Option B: The normal buffer size should be kept in priority. Thus, optionally, the second type of buffer size 504/514 is included in the buffer status report with higher priority comparing to the first type of buffer size 506/516 when available uplink resource for transmitting buffer status is limited.

Option C: The buffer size corresponding to the high priority should be kept in priority. For example, both normal buffer sizes and early buffer sizes are per LCG. The MAC layer is aware of the association between LCG ID and priority. Thus, optionally, information of buffer size with higher priority from the first type of buffer size 506/516 and the second type of buffer size 504/514 is included in the buffer status report when available uplink resource for transmitting buffer status is limited.

In some embodiments, the buffer status to be reported further comprises information of a logical channel group 518 for transmitting data, as shown in FIGS. 5C to 5F.

FIG. 6A is a schematic diagram illustrating a short early BSR; and FIG. 6B is a schematic diagram illustrating a long (truncated) early BSR. In the second scenario, the early buffer status (early BSR) and normal BSR may be separate.

In one example, as shown in FIG. 6A, one 'total early buffer size' may also be used to indicate the total amount of buffer size across all the LCGs of the BSR reported by the child IAB node 104 or UE 102. The LCG ID is not included in the early BSR since it is the total amount. Thus, optionally, the received BSR comprises a plurality of logical channel groups for receiving data and a buffer size for each of the logical channel groups; the first type of buffer size 606 comprises an early buffer size indicating an amount of data that is expected to be received in the said plurality of logical channel groups.

Similar to the first scenario, if the IAB node 104 receives more than one BSR from the child IAB node 104 and/or UE 102, the different buffer sizes can be accumulated to the same total early buffer size. All BSRs received from child IAB nodes and/or UEs until MAC PDU assembly (MAC PDU including the BSR MAC CE) are considered for total early buffer status. Those BSRs for which data is meanwhile already received at the IAB node, but not anymore expected to be received, is not reported in the early BSR, since this data is now already considered as the IAB node's own data. If more than one BSRs are received from the same child IAB or UE before next BSR is reported, the early IAB BSR should only include buffer status according to the latest received BSR.

In another example, as shown in FIG. 6B, the buffer sizes received from the child IAB node 104 or UE 102 will be re-mapped to multiple buffer sizes based on the priority (e.g LCG in the receiving node side). For example, the buffer sizes for LCG #1, LCG #2 and LCG #3 are received by IAB node2, LCG #1, LCG #2 and LCG #3 will be re-mapped to new LCGs, such as LCG #2, LCG #3, LCG #4 in the receiving parent IAB node side. The dedicated LCID will be allocated for the receiving node to differentiate the early BSR from normal BSR.

Similar to the first scenario, the early buffer size from different IAB nodes and/or UEs corresponding to the same priority/LCG may be added together. If more than one BSRs are received from the same child IAB or UE before next BSR is reported, the early IAB BSR should only include buffer status according to the latest received BSR.

Optionally, the received BSR comprises a plurality of logical channel groups for receiving data and a buffer size for each of the logical channel groups; the first type of buffer size 616 is organized according to priority information. Information of logical channel groups may be used to identify priority information.

Similarly, the buffer status to be reported further comprises information of a logical channel group 618 for transmitting data.

For the truncated BSR format, if the number of buffer size fields included is maximized, while not exceeding the number of padding bits, in the combined BSR, selection of buffer size is required. Three exemplary options are provided as follows:

Option A: The early buffer size for early BSR should be kept in priority. The reason is that one-bit indication in legacy BSR format will indicate whether the corresponding LCG has available data for transmission. Thus, optionally, the first type of buffer size 606/616 is included in the buffer status report with higher priority comparing to the second type of buffer size when available uplink resource for transmitting buffer status is limited.

Option B: The normal buffer size should be kept in priority. Thus, optionally, the second type of buffer size is included in the buffer status report with higher priority comparing to the first type of buffer size 606/616 when available uplink resource for transmitting buffer status is limited.

Option C: The buffer size corresponding to the high priority should be kept in priority. For example, both normal buffer sizes and early buffer sizes are per The MAC layer is aware of the association between LCG ID and priority. Thus, optionally, information of buffer size with higher priority from the first type of buffer size 606/616 and the second type of buffer size is included in the buffer status report when available uplink resource for transmitting buffer status is limited.

In another exemplary embodiment, if the BSR including early buffer size has been triggered and there is no UL-SCH resource available for a new transmission, the scheduling request (SR) corresponding to the logical channel of IAB node transmitting the early buffer size will be triggered. The SR is associated with one or more LCHs. In early IAB BSR, the receiving IAB node cannot know which LCH has the data available for transmission.

SR is a special physical layer message for UE to ask an IAB node, or an IAB node to ask its parent IAB node, to send UL grant so that the UE or IAB node can transmit PUSCH. The UE is then able to transmit the data after receiving the UL grant.

The SR selection can be determined based on the following principle. The LCG which is related with buffer size reported by the child IAB node or UE will be re-mapped to the LCG of the IAB node transmitting side. The SR configuration of the highest priority LCH of the re-mapped LCGs can be applied. If more than one BSRs are received from the child IAB node and/or UE, the SR selection should consider all the LCGs of multiple BSRs reported by the child IAB node and/or UE.

In one example, with reference to the system structure of FIG. 1A, a process may be carried out according to the following steps:

Step 1: UE2 200, or IAB node3 104, accesses to gNB, or IAB donor 106, by multiple hop.

Step 2: UE2 200, or IAB node3 104, reports the BSR to parent IAB node2 when BSR is triggered.

Step 3: When IAB node2 receives the BSR from the UE2 200, or the child IAB node3, IAB node2 is able to know the amount of data which is expected to be received. In this step, the DU in IAB node2 will transmit the BSR information to MT in the IAB node.

Step 4: IAB node2 is triggered to transmit the buffer size of data which is expected to be received.

Step 6: IAB node1 will allocate UL grant to the IAB node2 based on the reported BSR.

Step 5: If the BSR including early buffer size has been triggered and there is no UL-SCH resource available for a new transmission, the SR corresponding to the logical channel of IAB node transmitting the early buffer size will be triggered.

Step 6: IAB node2 transmits the SR to parent IAB node1.

Step 7: IAB node1 will allocate UL resource to IAB node2 for BSR transmission

Step 8: IAB node2 will transmit the BSR when receiving the UL resource from IAB node1.

In some embodiments, the apparatus may comprise: a receiver 314 that receives a plurality of BSRs from a plurality of remote devices; and a transmitter 312 that transmits a buffer status indicating that data is expected to be received; wherein the transmitter 312, upon determination that there is no uplink resource available, transmits a scheduling request (SR).

Optionally, the BSRs comprise a plurality of logical channel groups; a priority value is obtainable from identifications of the logical channel groups; and transmission of the SR is selected based on a highest priority value of logical channels included in the said plurality of logical channel groups.

Figure 7:
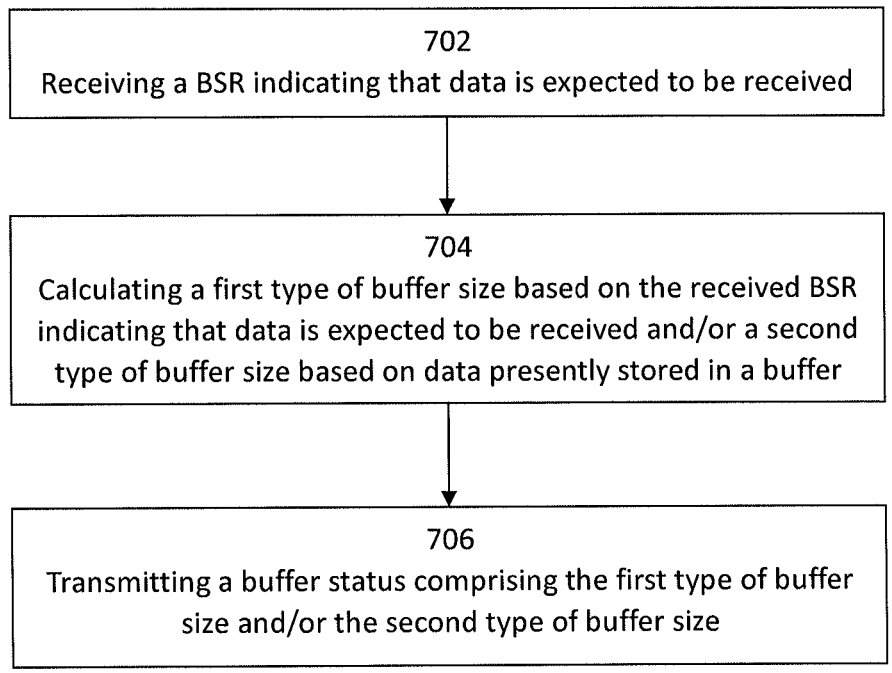
FIG. 7 is a flow diagram illustrating steps for communication with processing of a BSR.

FIG. 7 is a flow diagram illustrating steps for communication with processing of a BSR.

In step 702, the receiver receives a buffer status report (BSR) indicating that data is expected to be received.

In step 704, the processor calculates a first type of buffer size based on the received BSR indicating that data is expected to be received and/or a second type of buffer size based on data presently stored in a buffer.

In step 706, the transmitter transmits a buffer status comprising the first type of buffer size and/or the second type of buffer size.

The receiver may receive a plurality of BSRs from a plurality of remote devices. In some embodiments, the received BSR comprises a plurality of logical channel groups for receiving data and a buffer size for each of the logical channel groups; the first type of buffer size comprises an early buffer size indicating an amount of data that is expected to be received in the said plurality of logical channel groups; and the buffer status to be reported is a combined buffer status, and further comprises a first buffer status comprising information of the first type of buffer size; and a second buffer status comprising the second type of buffer size which is described as short BSR format or long BSR format or long truncated BSR format. In one example, the second buffer status comprises the second type of buffer size which is described as short BSR format; and the combined buffer status to be reported comprises the second buffer status and the first buffer status added to the end of the second buffer status. In another example, the second buffer status comprises the buffer sizes which are described as long BSR format or long truncated BSR format; and the combined buffer status to be reported comprises the second buffer status and the first buffer status added to the end of said long BSR format or long truncated BSR format.

In some embodiments, the first type of buffer size comprises a total early buffer size indicating an amount of data that is expected to be received from the said plurality of remote devices until a Media Access Control Protocol Data Unit (MAC PDU) assembly.

The receiver may receive a plurality of the BSRs from a single remote device; and the first type of buffer size is calculated based on last received BSR.

The buffer status to be reported may be allocated with a Logical Channel ID (LCID) which is different from LCIDs of the Short BSR, Long BSR, or Truncated BSR.

The received BSR may comprise a plurality of logical channel groups for receiving data and a buffer size for each of the logical channel groups; and the first type of buffer size is organized according to priority information. Information of the logical channel groups may be used as the priority information.

The received BSR may comprise a first received BSR from a first remote device and a second received BSR from a second remote device; the first received BSR comprises a plurality of instances of buffer size with a priority; the second received BSR comprises a plurality of instances of buffer size with the same priority; and the buffer size value with the same priority from the first received BSR and the second received BSR are accumulated to form a buffer size of the said priority.

The received BSR may comprise a first received BSR from a first remote device and a second received BSR from a second remote device; the buffer size with a priority is corresponding to the first type of buffer size; the buffer size with a same priority is corresponding to the second type of buffer size; the buffer size values with a same priority from the first type of buffer size and second type of buffer size are accumulated to form a buffer size of the said priority.

In some embodiments, the first type of buffer size is included in the buffer status report with higher priority comparing to the second type of buffer size when available uplink resource for transmitting buffer status is limited. Alternatively, the second type of buffer size is included in the buffer status report with higher priority comparing to the first type of buffer size when available uplink resource for transmitting buffer status is limited. Alternatively, information of buffer size with higher priority from the first type of buffer size and the second type of buffer size is included in the buffer status report when available uplink resource for transmitting buffer status is limited.

The received BSR may comprise a plurality of logical channel groups for receiving data and a buffer size for each of the logical channel groups; the first type of buffer size comprises an early buffer size indicating an amount of data that is expected to be received in the said plurality of logical channel groups.

The received BSR may comprise a plurality of logical channel groups for receiving data and a buffer size for each of the logical channel groups; the first type of buffer size is organized according to priority information. Information of logical channel groups may be used to identify priority information.

The buffer status to be reported may further comprise information of a logical channel group for transmitting data.

Figure 8:
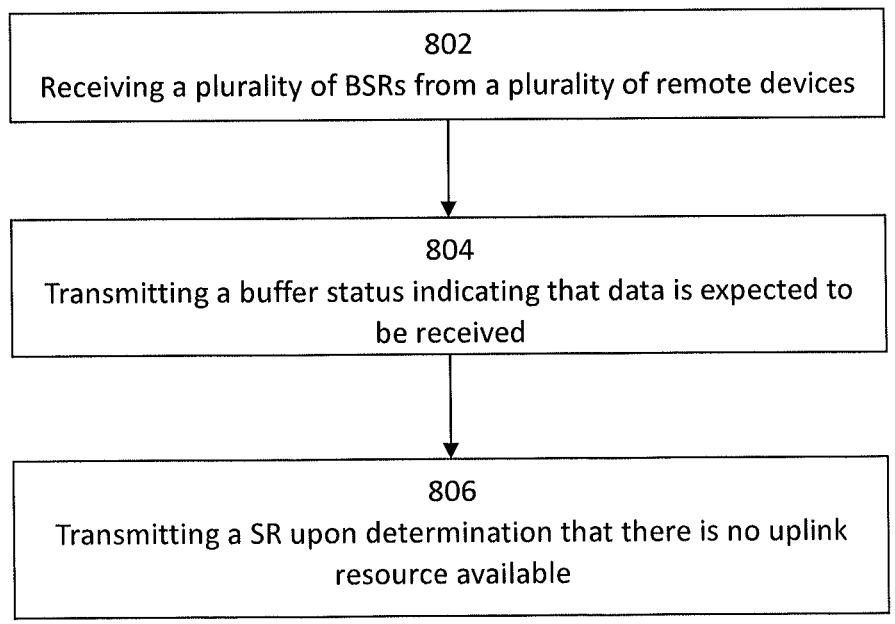
FIG. 8 is a flow diagram illustrating steps for communication with processing of a SR and a BSR.

FIG. 8 is a flow diagram illustrating steps for communication with processing of a SR and a BSR.

In step 802, the receiver receives a plurality of BSRs from a plurality of remote devices.

In step 804, the transmitter transmits a buffer status indicating that data is expected to be received.

In step 806, the transmitter transmits a scheduling request (SR) upon determination that there is no uplink resource available.

In some embodiments, the BSRs comprise a plurality of logical channel groups; a priority value is obtainable from identifications of the logical channel groups; and transmission of the SR is selected based on a highest priority value of logical channels included in the said plurality of logical channel groups.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A parent integrated access and backhaul (IAB) node, comprising:
    at least one memory; and
    at least one processor coupled with the at least one memory and configured to cause the parent IAB node to:
        receive a buffer status report directly from a plurality of child IAB nodes, wherein the buffer status report indicates data that the plurality of child IAB nodes expect to receive from other nodes;
        calculate a first type of buffer size based on the received buffer status report indicating that data is expected to be received; and
        transmit a buffer status comprising the first type of buffer size, wherein the buffer status to be reported is allocated with an early buffer status report logical channel identifier that is different from logical channel identifiers of a short buffer status report, a long buffer status report, or a truncated buffer status report.

2. The parent IAB node of claim 1, wherein the at least one processor is configured to cause the parent IAB node to receive a plurality of buffer status reports from a plurality of remote devices.

3. The parent IAB node of claim 2, wherein the first type of buffer size comprises a total early buffer size indicating an amount of data that is expected to be received from the plurality of remote devices until a media access control protocol data unit assembly is received.

4. The parent IAB node of claim 2, wherein:
    the received buffer status report comprises a first received buffer status report from a first remote device and a second received buffer status report from a second remote device;
    the first received buffer status report comprises a plurality of instances of buffer size with a priority; and
    the second received buffer status report comprises a plurality of instances of buffer size with the same priority; and the buffer size value with the same priority from the first received buffer status report and the second received buffer status report are accumulated to form a buffer size of the priority.

5. The parent IAB node of claim 1, wherein:
    the received buffer status report comprises a plurality of logical channel groups for receiving data and a buffer size for each logical channel group of the plurality of logical channel groups;
    the first type of buffer size comprises an early buffer size indicating an amount of data that is expected to be received in the plurality of logical channel groups; and
    the buffer status to be reported is a combined buffer status, and further comprises:
        a first buffer status comprising information of the first type of buffer size; and
        a second buffer status comprising a second type of buffer size, wherein the second type of buffer size comprises a short buffer status report format, a long buffer status report format, or a long truncated buffer status report format.

6. The parent IAB node of claim 5, wherein:
    the second buffer status comprises the second type of buffer size which comprises the short buffer status report format; and
    the combined buffer status to be reported comprises the second buffer status and the first buffer status added to the end of the second buffer status.

7. The parent IAB node of claim 5, wherein:
    the second buffer status comprises the second type of buffer size comprising the long buffer status report format or the long truncated buffer status report format; and
    the combined buffer status to be reported comprises the second buffer status and the first buffer status added to the end of the long buffer status report format or the long truncated buffer status report format.

8. The parent IAB node of claim 1, wherein:
    the at least one processor is configured to cause the parent IAB node to receive a plurality of the buffer status reports from a single remote device; and
    the first type of buffer size is calculated based on a last received buffer status report.

9. The parent IAB node of claim 1, wherein:
the received buffer status report comprises a plurality of logical channel groups for receiving data and a buffer size for each logical channel of the plurality of logical channel groups; and
the first type of buffer size is organized according to priority information, wherein information of the logical channel groups is the priority information.

10. The parent IAB node of claim 9, wherein information of a buffer size with a higher priority from the first type of buffer size and the second type of buffer size is included in the buffer status report when available uplink resources for transmitting the buffer status are limited.

11. The parent IAB node of claim 1, wherein:
the received buffer status report comprises a first received buffer status report from a first remote device and a second received buffer status report from a second remote device;
the buffer size comprises a priority corresponding to the first type of buffer size;
the buffer size has a same priority corresponding to the second type of buffer size; and
the buffer size values with the same priority as the first type of buffer size and second type of buffer size are accumulated to form a buffer size of the priority.

12. The parent IAB node of claim 1, wherein the first type of buffer size is included in the buffer status report with higher priority as compared to the second type of buffer size when available uplink resources for transmitting the buffer status are limited.

13. The parent IAB node of claim 1, wherein the second type of buffer size is included in the buffer status report with higher priority as compared to the first type of buffer size when available uplink resources for transmitting the buffer status are limited.

14. The parent IAB node of claim 1, wherein:
the received buffer status report comprises a plurality of logical channel groups for receiving data and a buffer size for each logical channel of the plurality of logical channel groups; and
the first type of buffer size comprises an early buffer size indicating an amount of data that is expected to be received in the plurality of logical channel groups.

15. The parent IAB node of claim 1, wherein:
the received buffer status report comprises a plurality of logical channel groups for receiving data and a buffer size for each logical channel of the plurality of logical channel groups; and
the first type of buffer size is organized according to priority information, wherein information of logical channel groups is used to identify priority information.

16. The parent IAB node of claim 1, wherein the buffer status to be reported further comprises information indicating a logical channel group for transmitting data.

17. A child integrated access and backhaul (IAB) node, comprising:
at least one memory; and
at least one processor coupled with the at least one memory and configured to cause the child IAB node to:
receive a plurality of buffer status reports directly from a plurality of user equipments (UEs);
transmit a buffer status indicating that data is expected to be received from the plurality of UEs, wherein the buffer status to be reported is allocated with an early buffer status report logical channel identifier that is different from logical channel identifiers of a short buffer status report, a long buffer status report, or a truncated buffer status report; and
upon determination that there is no uplink resource available, transmit a scheduling request.

18. A method performed by a parent integrated access and backhaul (IAB) node, the method comprising:
receiving a buffer status report directly from a plurality of child IAB nodes, wherein the buffer status report indicates data that the plurality of child IAB nodes expect to receive from other nodes;
calculating a first type of buffer size based on the received buffer status report indicating that data is expected to be received; and
transmitting a buffer status comprising the first type of buffer size, wherein the buffer status to be reported is allocated with an early buffer status report logical channel identifier that is different from logical channel identifiers of a short buffer status report, a long buffer status report, or a truncated buffer status report.

19. A method performed by a child integrated access and backhaul (IAB) node, the method comprising:
receiving a plurality of buffer status reports directly from a plurality of user equipments (UEs);
transmitting a buffer status indicating that data is expected to be received from the plurality of UEs, wherein the buffer status to be reported is allocated with an early buffer status report logical channel identifier that is different from logical channel identifiers of a short buffer status report, a long buffer status report, or a truncated buffer status report; and
upon determination that there is no uplink resource available, transmitting a scheduling request.

* * * * *